United States Patent
Mannheim Astete et al.

(10) Patent No.: US 10,780,674 B2
(45) Date of Patent: Sep. 22, 2020

(54) OBSCURATION HAVING SUPERIOR STRENGTH AND OPTICAL QUALITY FOR AN AUTOMOTIVE LAMINATE

(71) Applicant: AGP America S.A., Panama (PA)

(72) Inventors: Arturo Mannheim Astete, Lima (PE); Vincenzo Mannino, Lima (PE); Charles S. Voeltzel, Lima (PE); Laura Granados Caro, Lima (PE); Philip Denton Gordon, Lima (PE); Elena K. Mendoza Carranza, Lima (PE)

(73) Assignee: AGP America S.A., Panama (PA)

( * ) Notice: Subject to any disclaimer, the term of this patent is extended or adjusted under 35 U.S.C. 154(b) by 0 days.

(21) Appl. No.: 15/393,584

(22) Filed: Dec. 29, 2016

(65) Prior Publication Data
US 2017/0232713 A1  Aug. 17, 2017

Related U.S. Application Data

(63) Continuation-in-part of application No. 14/625,952, filed on Feb. 19, 2015, now Pat. No. 9,623,634.

(51) Int. Cl.
| | |
|---|---|
| *B32B 17/10* | (2006.01) |
| *E06B 3/663* | (2006.01) |
| *B60J 3/00* | (2006.01) |
| *B32B 7/12* | (2006.01) |
| *B60J 1/02* | (2006.01) |
| *B32B 38/00* | (2006.01) |
| *B32B 37/18* | (2006.01) |

(52) U.S. Cl.
CPC .. *B32B 17/10348* (2013.01); *B32B 17/10036* (2013.01); *B32B 17/1077* (2013.01); *B32B 17/10284* (2013.01); *B32B 17/10568* (2013.01); *B32B 17/10779* (2013.01); *B60J 1/02* (2013.01); *E06B 3/66304* (2013.01); *B32B 37/182* (2013.01); *B32B 38/145* (2013.01); *B32B 2250/03* (2013.01); *B32B 2255/10* (2013.01); *B32B 2307/41* (2013.01); *B32B 2605/08* (2013.01)

(58) Field of Classification Search
CPC ............................................. B32B 17/10174
USPC ...................................................... 428/195.1
See application file for complete search history.

(56) References Cited

U.S. PATENT DOCUMENTS

| | | | |
|---|---|---|---|
| 7,232,213 | B2 | 6/2007 | Smith et al. |
| 7,278,730 | B2 | 10/2007 | Elwakil |
| 8,002,938 | B2 | 8/2011 | Elwakil et al. |

(Continued)

FOREIGN PATENT DOCUMENTS

| | | | | |
|---|---|---|---|---|
| DE | 10 2011 004 500 A1 | 8/2012 | | |
| GB | 2264452 A | * | 9/1993 | ....... B32B 17/10036 |

OTHER PUBLICATIONS

Office Action Related U.S. Appl. No. 15/498,852.

*Primary Examiner* — Ian A Rummel
(74) *Attorney, Agent, or Firm* — The Morales Law Firm; Joseph L. Morales (57) ABSTRACT

The object of this invention is to provide a laminated automotive glazing having an obscuration area produced by printing the obscuration on a film laminated between at least two layers of plastic interlayers rather than printing and firing an enamel frit onto the glass. This results in a laminate having superior optical quality, higher strength and a lower probability of breakage as compared to a laminate with a black enamel frit obscuration.

13 Claims, 10 Drawing Sheets

(56) References Cited

U.S. PATENT DOCUMENTS

| | | | |
|---|---|---|---|
| 9,623,634 B2* | 4/2017 | Mannheim Astete | ........................ B32B 17/10348 |
| 2003/0150848 A1 | 8/2003 | Noguchi et al. | |
| 2005/0142332 A1* | 6/2005 | Sauer | ..................... B32B 17/10 428/172 |
| 2007/0029026 A1 | 2/2007 | Bolognese | |
| 2008/0261795 A1* | 10/2008 | Prunchak | .................. C03C 1/00 501/18 |
| 2008/0286542 A1 | 11/2008 | Hayes et al. | |
| 2013/0258436 A1 | 10/2013 | Podbelski | |
| 2017/0355858 A1 | 12/2017 | Loccufier | |

* cited by examiner

OBSCURATION HAVING SUPERIOR STRENGTH AND OPTICAL QUALITY FOR AN AUTOMOTIVE LAMINATE

BRIEF SUMMARY OF THE INVENTION

The presently disclosed invention is directed to a laminated automotive glazing having an obscuration that has superior optical quality and strength as well as the method used to create said glazing.

BACKGROUND OF THE INVENTION

Black enamel frit obscurations are commonly printed on laminated and tempered automotive safety glazing.

Obscurations have multiple functional and aesthetic requirements.

The obscuration must be substantially opaque. This is needed to prevent the adhesive, used to mount the glazing to the vehicle, from being seen from the outside of the vehicle. It must also protect the adhesive from the harmful effects of ultra-violet. The obscuration also serves this same function for the equipment attached to the inside surface of the glazing. On heated and coated glazing, the obscuration is used to hide the edge of the coating, bus bars, leads and any other items that would detract from the appearance of the vehicle. The obscuration also has the additional aesthetic requirement that it have a dark black color and a reflective glossy appearance.

In addition to hiding the adhesive, equipment mounted to the glazing and other items the obscuration must be durable. It must last for the life of the glazing, without fading, having a reduction in adhesion or otherwise failing. Another important functional requirement is that the obscuration must protect the adhesives from the ultraviolet rays of the sun.

The obscurations are usually printed on the surface 24 of glass facing the inside of the vehicle.

In addition to the obscurations, markings required for regulatory compliance (date, manufacturer, compliance classification, model, etc.) and images, such as trademarks, barcodes etc., are also printed on the glass.

Obscurations have historically been black. One of the reasons for this comes from the limitations imposed by ceramic frits. It is difficult to produce frits, in colors other than black, that have the durability needed and for which the color can be reliably replicated from run to run. The other reason is that a black obscuration can be used with any color of paint.

The practice of applying black enamel frit obscurations became common place the 1980s when the industry switched from the rubber H channel and the butyl adhesive strip windshield mounting systems to polyurethane adhesive mounting of safety glazing. This change was made in response to the poor safety performance of the prior technology. The channel/butyl mounted windshields were often dislodged on impact allowing the occupants to be ejected from the vehicle. To improve occupant retention in crashes, the industry switched to polyurethane adhesive mounting. Today, on new vehicles, butyl is no longer used and the rubber H channel mount is only seen on commercial and off-road vehicles.

One advantage of the butyl strip system was that the strip was narrow enough to be covered by a molding or trim strip to obscure the butyl and the vehicle mounting flange. The rubber channel also did not require an edge obscuration as the rubber covered both the edge of glass and the flange.

This had to change to enable the use of polyurethane. To obtain the required bond strength, between the vehicle and the glass, it was found that the bead of polyurethane had to be substantially wider than the butyl strip had been. With a minimum width of 19 mm, it was no longer practical to obscure the adhesive from view from the outside with a trim strip or molding due to the width that would have been required. In addition, polyurethane needs to be protected from ultraviolet light, UV, to prevent degradation. As a result, the black enamel frit obscuration band was added to the glass, to obscure the view of the polyurethane and to protect the polyurethane by blocking the UV. This obscuration band of black enamel frit that encircles the day light opening is commonly called the "black band".

While there can be no doubt that the polyurethane system has saved countless lives, it has some disadvantages.

Black enamel frit is comprised of pigments, a carrier, binders and finely ground glass. Other materials are also sometimes added to enhance certain properties: the firing temperate, anti-stick, chemical resistance, etc. The black frit is applied to the glass using a silk screen or ink jet printing process prior to heating and bending. During the bending process, the finely ground glass in the frit soften and fuses with the glass surface. The frit is said to be "fired" when this takes place. This is very similar to the process used to apply enamel finishes on bathroom fixtures, pottery, china and appliances.

Metals and many other types of materials have an ultimate yield strength at which point the material will fail. However, with glass we can only specify a probability of breakage for a given value of stress. Looking at glass at the molecular level, we would expect the strength to be very high. In fact, what we find in practice is that glass has a very high compressive strength, as expected, but very low tensile strength.

For a given set of glass test specimens, with identical loading, the point of failure at first glance might appear to be a random variable. In fact, the yield point follows a Weibull distribution and the probability of breakage can be calculated as a function of, stress, duration, surface area, surface defects and the modulus of glass.

To the naked eye, float glass appears to be near perfect. Any defects that may be present as so small as to not be visible. But, in fact, at the microscopic level, the surface appears rough and can be seen to be dotted with flaws. When the glass is placed in tension, these surface defects tend to open up and expand, eventually leading to failure. Therefore, laminated automotive glass almost always fails in tension. Even when not in tension, the surface defects react with the moisture in the environment and slowly "grow" over time. This phenomenon is known as slow crack growth. As a result, glass weakens as it ages.

A fired black frit increases surface defects. This can be seen if the black pigment of a fired black obscuratoin is chemically dissolved. The surface of glass will have a frosted appearance, similar to sand blasted or chemically etched glass. The frosted appearance is due to the myriad surface defects present from the fused glass. This makes the surface weaker increasing the probability of breakage. Testing has shown that glass with black frit fails at a stress level that is substantially lower than glass that does not have black frit.

Another problem arises from the thermal gradients that occur during the bending process. As one would expect, the black frit absorbs more radiant heat than the clear glass. Radiant heat is the predominant heat source used for glass bending. The black frit areas of the glass run hotter than the adjacent clear areas. With glass being a poor conductor of heat, gradients in the tens of degrees centigrade can arise over a short distance. These high abrupt thermal gradient on the surface result in optical distortion and high residual along the inner edge of the black band. This is known as the "burn" line in the industry. This can often be seen along the edges of the black obscuration found along the edges of most windshields.

Figure 9A:
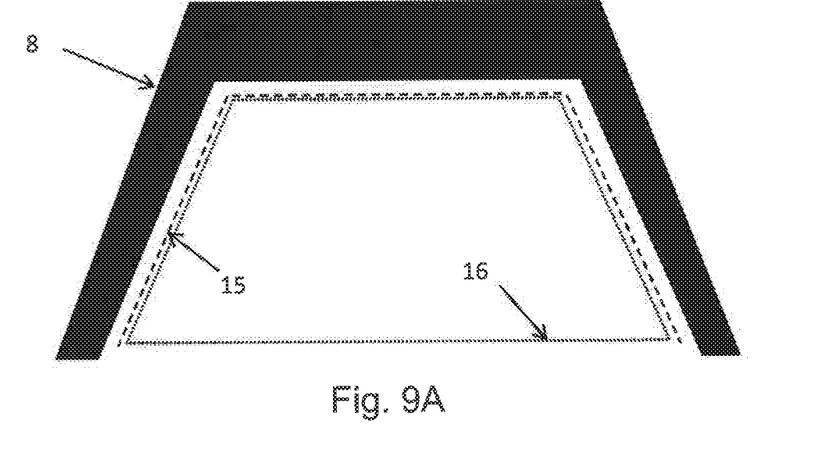
FIG. 9A shows a black frit obscuration 8 and the buffer zone 15 between the black frit and camera filed of view 16.
Figure 9B:
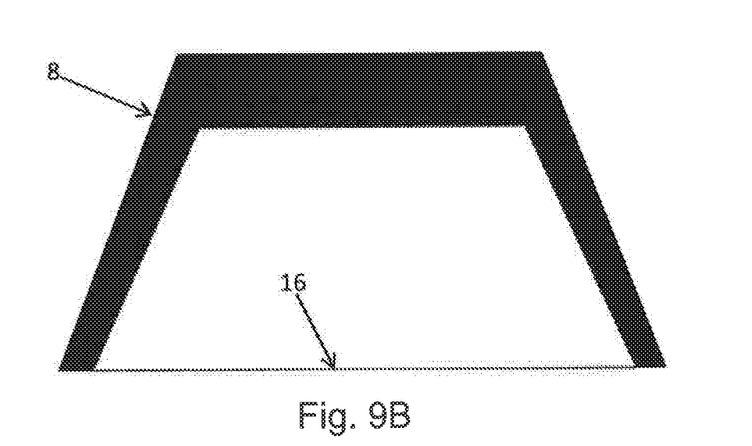
FIG. 9B shows an obscuration 8 printed on film with no buffer zone 15 between the black frit and camera field of view 16.

Obscurations used with glass mounted camera systems are forced to designate a "buffer" zone 15 between the edge of the camera field of view 16 and the edge of the black frit 8 (FIG. 9A) to exclude the burn line. This is an accommodation required due to the limitations of the black frit. The ideal would be to have no buffer zone 15 as the larger obscuration reduces the driver field of view and the natural light entering the vehicle (FIG. 9B).

One method used to address the burn line problem is the dot fadeout. Starting at the inner solid edge of the black paint, rows of increasingly smaller dots are painted on the glass. This is the same principle as used in greyscale printing. This reduces the rate of change in the surface temperature, spreading it over a wider area. The dot fadeout also helps to hide the distortion. However, on some parts, even a wide dot fadeout is not sufficient to eliminate all distortion. A wide dot fadeout also may not be possible depending upon the size of the opening and the regulatory requirements for driver vision. Dot fadeout patterns are also undesirable in that they increase the production cost of the glazing.

Another problem is surface mismatch. A laminate is comprised of at least two layers of glass. The frit is typically applied to only one of the glass layers. This can result is a slight difference in the shape of the surfaces. When the two surfaces are forced together during lamination, the mismatch results in residual stress in the laminate and optical distortion.

Even with these drawbacks, the area of the windshield with a black frit obscuration has increased in recent years. There are a number of reasons why this is occurring.

Figure 1:
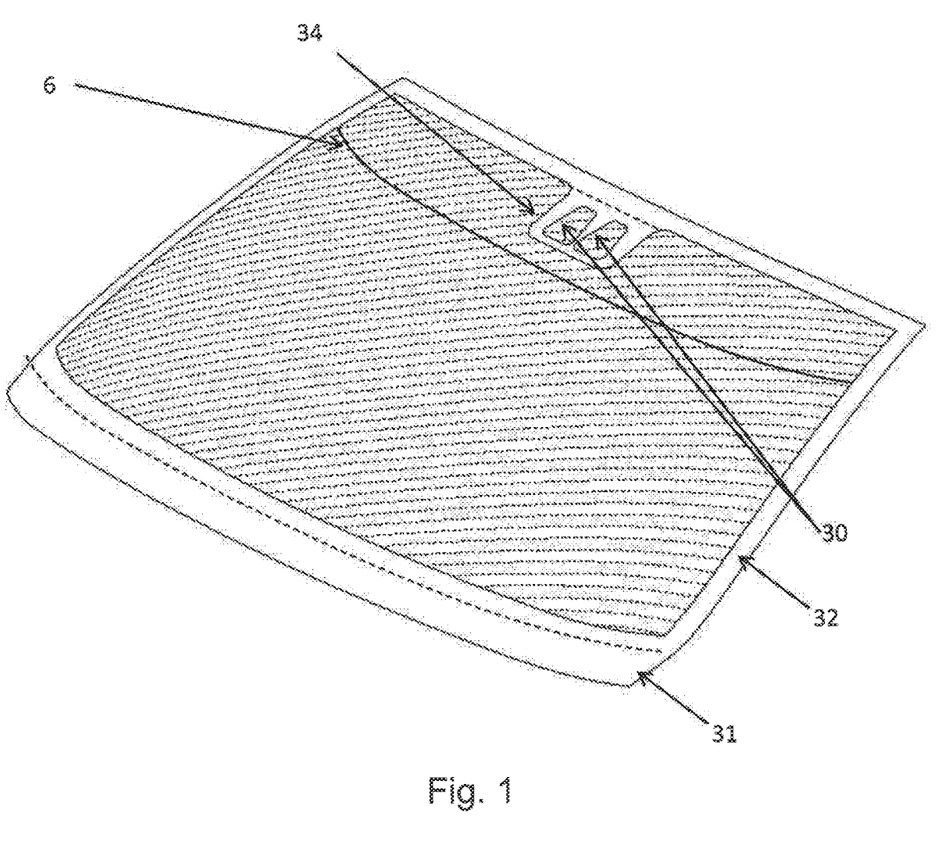
FIG. 1 shows a typical automotive windshield with a black band obscuration 32, a wiper rest obscuration 31 and an equipment obscuration 34 extending downward from the black band obscuration, having openings 30 to provide a forward field of view for two cameras.
Figure 2:
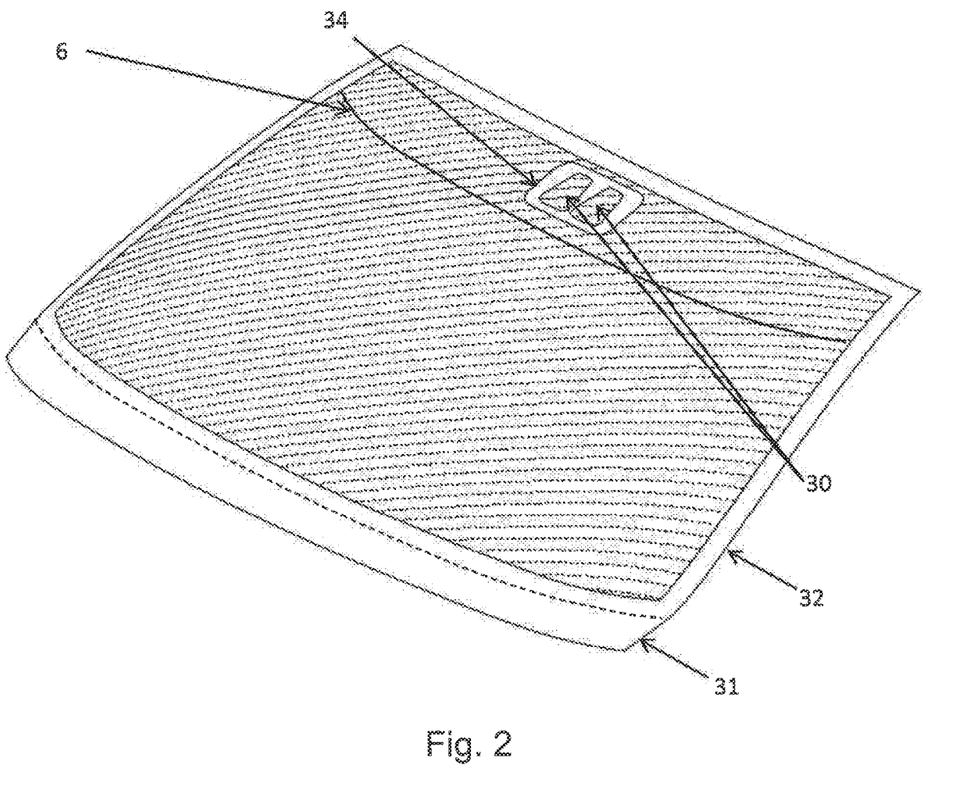
FIG. 2 shows an automotive windshield with a black band 32, a wiper rest obscuration 31 and an obscuration 34 separated from the black band, having openings 30 to provide a forward field of view for two cameras.8
Figure 3:
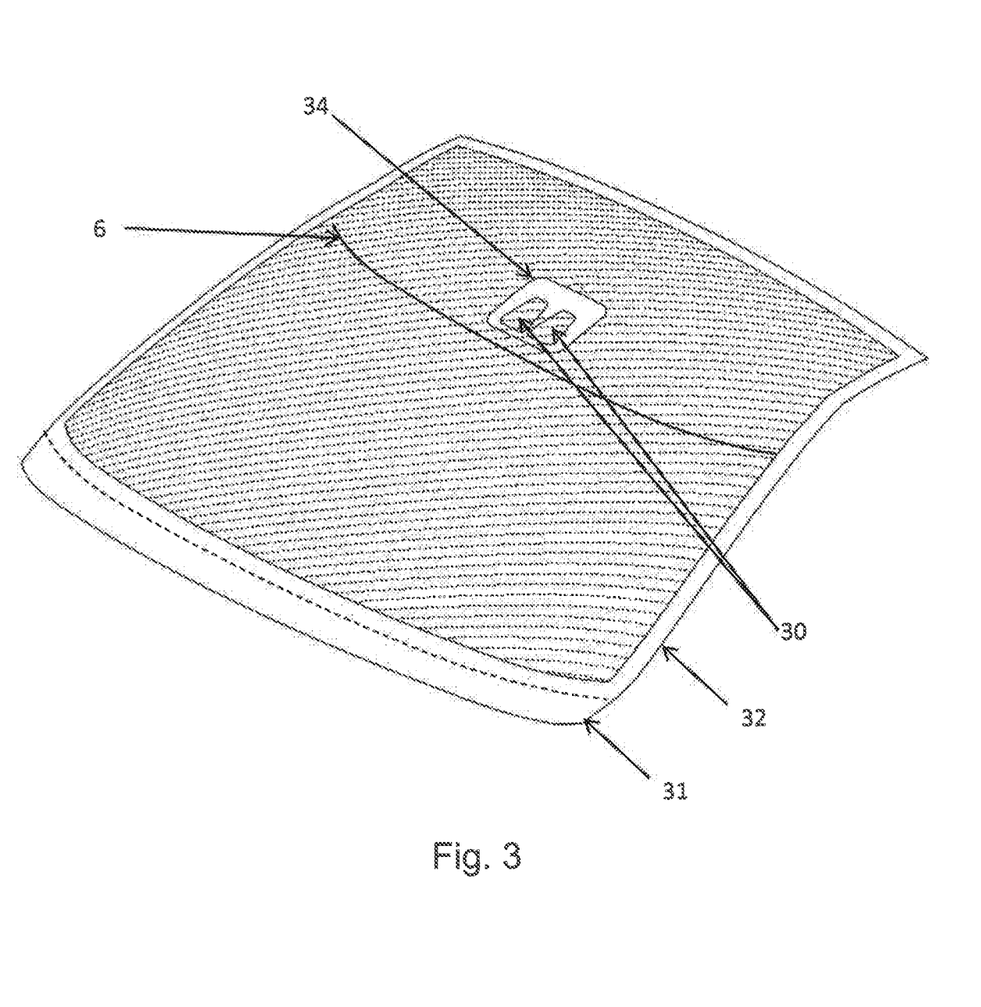
FIG. 3 shows a panoramic automotive windshield with a black band 32, a wiper rest obscuration 31 and an obscuration 34 separated from the black band, having openings 30 to provide a forward field of view for two cameras.
Figure 4:
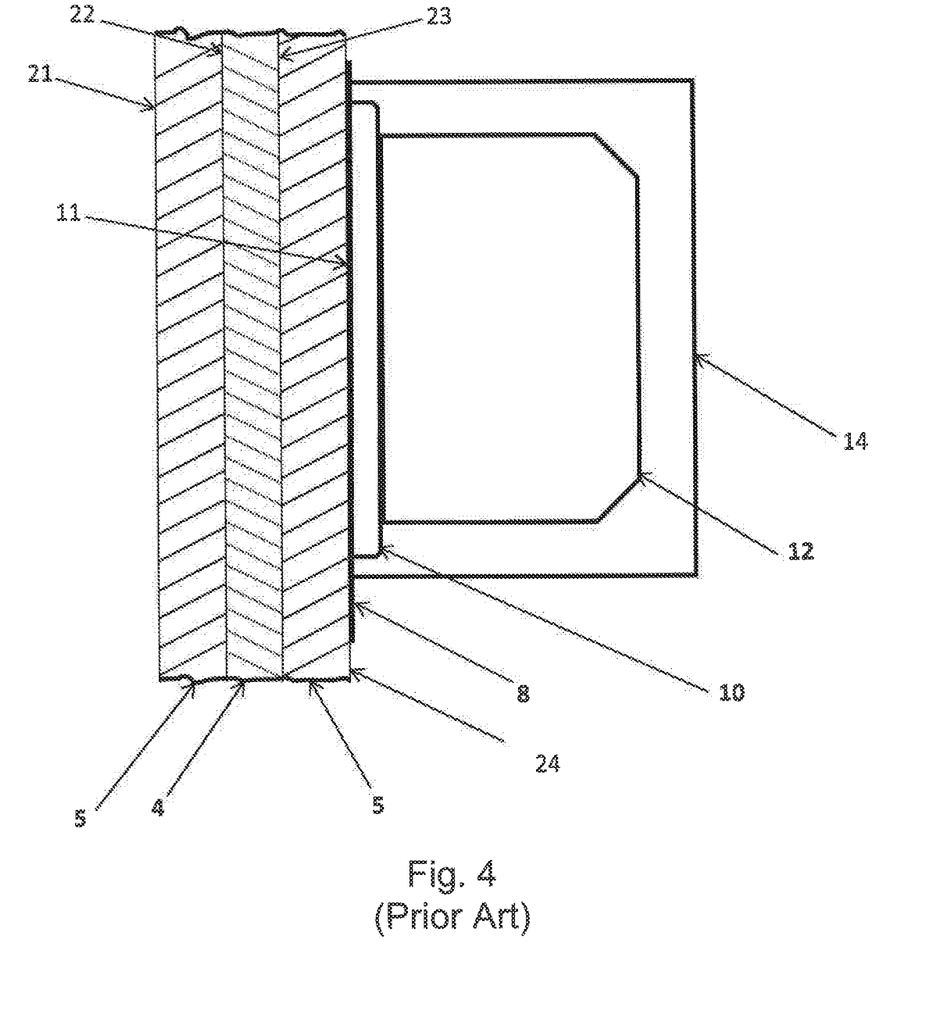
FIG. 4 shows the obscuration 8 of the prior art, a black enamel frit applied to the fourth surface 24.

To improve aerodynamics and lower wind noise, the wiper rest position on many vehicles is located out of sight below the hood line. When this is done, the bottom edge of the windshield is extended to form a "wiper rest" 31 so as to provide a resting surface for the wipers when not in use as shown in FIGS. 1, 2 and 3. This area is typically obscured with a black enamel frit 31 extending downward and connecting to the black band. The width of this area can be in excess of 15 cm. This area is also normally heated, to prevent snow and ice from building up, using a screen print conductive silver on the number four 24 surface of the glass. The power density required to keep this area free of ice and snow is double that of a rear window defroster due to the snow and ice that is packed in from the wiper action. The wide wiper rest frit obscuration, with drawbacks intrinsic to frit, coupled with the thermal stress of melting snow and ice, leads to a high breakage rate for these windshields.

As the electronic content of modern vehicles has increased, the area of the windshield, near the top center, has become increasingly crowded on many vehicles. Once the province of just the rear-view mirror, we now find a wide array of equipment mounted in this location.

One of the first devices to compete for this area was the infra-red rain sensor use to provide for a full automatic mode of windshield wiper operation as well as other vehicle functions such as closing the sun roof and pulsing the brakes to keep the rotors dry. The rain sensor must have a lens optically coupled to the number four 24 surface of the windshield. An IR LED shines light onto the number one 21 surface. The amount of light reflected back correlates to the amount of water present on the number one 21 surface. The field of view of the lens must be in the area cleared by the wipers in order to function properly. Therefore, the lens is generally mounted on or near the vertical centerline near the top of the wiped area. Power and signal wiring is required for the sensor to work. In addition to the lens 10, the sensor comprises a housing 12 and a cover 14 all of which need to be hidden from view from the outside of the vehicle to avoid an unsightly clutter appearance.

The rear view mirror itself has undergone a major transformation. Once a purely mechanical device, electro-chromic automatic dimming rear-view mirrors have become a popular option and are standard equipment on many models. The additional components required to provide this functionality make the mirror heavier and therefore require a larger footprint mounting bracket than a standard non-dimming mirror.

The rear-view mirror has further evolved as telematics driver aid systems, integrated garage door openers and hands free blue-tooth interfaces have been introduced. The rear view mirror is a convention place to locate control push-buttons and microphones which require additional wires which also must be protected and covered. Power also needs to be provided to the mirror. A cover is often provided to protect the cable and to hide it from the inside of the vehicle.

The use of cameras, requiring a wide field of view and a high level of optical clarity, is also growing at a rapid rate with the introduction of vehicles capable of various levels of autonomous operation. The resolution of the cameras is also increasing at an equally fast rate. These typically must be mounted on the windshield in the wiper area. Early initial applications were for night-vision. Today, camera based systems are used to provide a wide array of safety functions including adaptive cruise control, obstacle detection, lane departure warning and support for autonomous operation. Many of these applications require the use of multiple cameras. A clear undistorted field of view, with minimal double imaging and excellent MTF (Modulation Transfer Function, a measure of how well a lens maps an image to a sensor), is especially critical for camera based systems to perform as intended. It is essential for these systems to be able to quickly differentiate between objects, capture text, identify signage, and operate with minimal lighting. Further, as the resolution of the cameras used increases the need for a clear distortion free field of view increases.

While covers 14 and various styling methods can be used to obscure the components and cables from the inside, we also need to maintain clean lines and a good aesthetic when the vehicle is viewed from the exterior.

Standard practice has been to extend the black enamel frit band 32 to create an obscuration 8 on the number four 24 surface with openings in the obscuration 30 to provide for the required field of view as shown in FIGS. 1, 2 & 3.

When the black enamel frit band 32 is extended downward from the top center black band to create an obscuration 8 on the number two 22 or number four surface 24, distortion and stress can become a major problem FIG. 1. This is because the black frit is extending further from the edge into the area that where more heat must be applied to bend the glass. The large surface area of the obscuration increases the probability of breakage due to the surface defects and stress introduced by the frit. This is also a critical viewing area.

A panoramic windshield is a windshield in which the top edge of glass has been extended to include at least a portion of the roof giving the driver a vertical field of vision of at least 45 degrees as defined by the applicable regulatory standards.

In the case of a panoramic windshield FIG. 3, the problem is even more pronounced as the obscuration 8 extends several cm from the top edge and is located near the weakest point of the windshield. This is also where the highest temperatures are required to bend the glass.

The process for printing on laminate interlayers was first commercialized in 2003. Some of the key patents include: U.S. Pat. No. 8,002,938 B2, U.S. Pat. No. 7,232,213 B2 and U.S. Pat. No. 7,278,730. To date, the primary application has been for architectural laminates, providing a means to produce images and marking, in vivid colors at a resolution that was never before possible. However, little has been done in the automotive market. DE201110004500 teaches the use of a printed plastic layer for use in an automotive laminate for reducing weight and providing artistic freedom to the designer. US 20080286542 provides for an acoustic laminate with an image printed on film and adhered to the interlayer though use of an adhesion promoter.

One of the reasons why we have not seen the adaptation of printed interlayers in automotive is that the printed interlayers do not meet the functional requirements of an obscuration. A screen print enamel frit provides a high degree of protection from UV which is needed to protect the polyurethane used to bond the glazing to the vehicle opening. Inks printed on the interlayer do not have the same level of opacity and UV blocking ability that the black enamel frits do. They also do not provide the deep black glossy appearance of a fired black frit. This failure is due to the limited types of ink that are available for printing on interlayers.

One of the primary functions of the interlayer is to serve as the adhesive to hold the sheets of glass together. In the event of an accident, the interlayer holds the shards of glass together and helps to prevent the occupant from being ejected. In the event of an impact from the exterior of the vehicle, the interlayer helps to prevent the projectile from penetrating and entering the cabin. Penetration resistance is a key requirement for regulatory compliance. Any ink applied to the interlayer, must not interfere with this essential safety function. The interlayer must be able to bond to the glass through the print. Adhesion promoters are often needed even with the best ink formulations. This requirement severely limits the type of inks that can be used.

Interlayer sheets do not lend themselves well to the automated feed systems of typical printing equipment. The various materials used to produce interlayer sheets are all thermo plastics with glass transition points in the room temperature range or lower. As such, the sheets are limp and difficult to work with. The surface of interlayers for lamination also need to be embossed to facilitate handling and the lamination process. It is difficult to print on an embossed surface.

SUMMARY OF THE INVENTION

Having examined the drawback of using a black enamel frit to produce an obscuration, it can be appreciated that it would be desirable to produce a windshield that did not have the limitations that result from producing black enamel frit obscurations on glass.

The subject of the immediate invention is a laminated automotive glazing with a least one obscuration produced by printing the obscuration directly onto at least one surface of at least one sheet of a plastic film or on the interlayer itself.

The film with the printed obscuration is then laminated between at least two of sheets of a thermoplastic interlayer 4 such as a PVB, EVA or PU. Alternately, a laminating resin can be used. Other markings and images can also be printed on the sheet 17. A wedge interlayer can be used to further improve double image.

The unaltered original surface of the interlayer is able to bond to the glass and retains its original adhesion to the glass. The addition of the film 17 increases the penetration resistance of the laminate. As a result, the printed area of the sheet does not need to have as high of a level of adhesion to the interlayer as the interlayer needs to have to the glass. The interlayer does not have to maintain adhesion through the print and adhesion promoters are not needed for the film. The primary requirement is that the ink have good adhesion to the film and to the interlayer. This opens the possibility to use a wider range of inks than possible than with inks that need to be printed directly onto an interlayer.

Laminates made in this manner are stronger and have superior optical quality, especially in the areas of the laminate used by cameras.

BRIEF DESCRIPTION OF THE DRAWINGS

FIG. 7 consists of:

FIG. 8 consists of:

FIG. 9 consists of:

REFERENCE NUMERALS

3 Wedge Plastic Interlayer
4 Plastic Interlayer

5 Glass
6 Sunshade
8 Obscuration
10 Equipment Mounted To Glass
11 Adhesive
12 Device Housing
14 Cover
15 Buffer
16 Field of view
17 Film
21 First Surface of Glass
22 Second Surface of Glass
23 Third Surface of Glass
24 Fourth Surface of Glass
30 Openings in Equipment Obscuration
31 Wiper Rest Obscuration
32 Black Band Obscuration
34 Equipment Obscuration
40 Double image Angle
41 Observation point
42 Incident ray from image
43 Primary image
44 Secondary image
45 Wedge angle
46 Incident angle
48 Refracted ray
50 Surface normal
52 Angle of deviation
56 Inclination angle

DETAILED DESCRIPTION OF THE INVENTION

The invention eliminates the drawbacks associated with the black frit obscurations of the prior art by printing at least some of the obscurations on a plastic film layer which is then laminated as an integral part of the glazing. This allows for a more uniform heat distribution across the part during bending which reduces residual stresses and the associated surface mismatch, warping and distortion caused by the thermal gradients.

Film, as used in this document shall refer to single ply/layer compositions as well as films comprised of multiple layers. A common plastic used in such films is PET (polyethylene terephthalate) but as can be appreciated can be of any other composition found to be suitable can be used. Some examples include but are not limited to: metal based heat reflecting films, non-metal based heat reflecting films, tint films, and heat absorbing films, Suspended Particle Device (SPD) films, Polymer Dispersed Liquid Chrystal (PDLL) films, conductive coated films, and ordinary PET.

There are many PET based automotive film products in production providing a ready base of field proven performance films that can be used as the film of the invention. One of the most common and oldest has a heat reflecting coating for enhancing solar load control. Others include but are not limited to: films used to improve occupant retention, stiffen the laminate and provide for variable control of visible light transmission. To laminate these films 17, two layers of interlayer 4 are needed to achieve the required adhesion to the glass and to the film. An obscuration 16 can be printed on either or both sides of the film.

The obscurations of the immediate invention are not limited to inkjet printing as is the prior art. The obscurations can be printed using inkjet, screen print, pad print or any other conventional printing means. The obscurations can be printed on either or both sides of the film.

The unaltered original surface of the interlayer is able to bond to the glass and retains its adhesion to the glass. The addition of the film 17 increases the penetration resistance of the laminate. As a result, the printed area of the sheet does not need to have as high of a level of adhesion to the interlayer as the interlayer needs to have to the glass. This opens the possibility of uses a wider range of inks than possible than with inks that need to be printed directly onto an interlayer.

During development, five printing technologies were evaluated and more than sixteen inks were tested. The criteria for the inks was based upon appearance (opacity and color), adhesion of ink to the PET, adhesion of ink to the interlayers and durability. The objective was to find a black color ink with high opacity, having good adhesion to PET and interlayers and durability.

A variety of different inks were tested using screen-printing. Solvent inks and UV inks for screen-printing process were evaluated. Both, UV and solvent inks had good durability results. Both inks also presented good adhesion results on PET penetrating into the substrate and creating a permanent bond. The UV ink was selected for prototype production due to the fast cure time, no need to add a catalyst and low volatile content. The UV ink is also ready to use with no need to add any catalyst and is instantly hardened by intense UV light polymerization (curing). The high reactivity of the ink delivered good curing results. UV ink properties give flexibility to work on large and small format printing. Surprisingly, it was found that obscurations printed in this manner also could be printed directly onto the interlayer.

Some modifications to the ink were required. The ink modifications included tuning the UV frequency response and removing silicon from the formulation. It was found that the silicon lead to delamination in the areas near the glass edge. Broad band UV was found to cause warping or modulus of the substrate due to over saturation of energy. Restricting the overall bandwidth to a specific wavelength enhanced the ability to cure the ink using less overall energy. The obscuration produced has a dark black color and a shiny gloss comparable to black frit. The printed sheets are then cut to size and assembled into the laminate. For large scale production, roll to roll printing could be used.

Protection of the polyurethane adhesive from UV is achieved thorough the opacity of the ink in combination with the use of a UV blocking interlayer. Such UV blocking interlayers are well known in the art and have been in common use for many years.

To aid in the alignment of the printed sheet 17 when assembling the laminate, registration marks can be printed on the sheet 17.

Another benefit of the process is the ability to fine tune the optical properties and appearance of the laminate. A near limitless range of colors can be produced. Properties in the non-visible portion of the spectrum can also be enhanced. Some performance films are sensitive and degrade over time, with exposure to the near UV. Additives that absorb or reflect the specific wavelengths of interest can be added to the ink to achieve targeted optical properties.

If a combination of frit and ink are used for the black band 32 and the equipment obscuration 34, any difference in the appearance between the two may be noticeable. In that case, separating the equipment obscuration 34 from the black band, as shown in FIG. 2, will improve the aesthetic. The transition line between the black band 32 and the wiper rest 31 will not generally be visible.

In the obscuration areas where the invention is applied, all of the detrimental effects of the black enamel frit on the glass are eliminated resulting in superior optical quality, lower stress, and a lower probability of breakage.

In addition to the benefits to the finished laminate, the elimination of the non-uniform heating and high thermal gradient present in the black frit areas increases yields through the bending process and also, due to the higher strength and lower surface mismatch, increases yields through the lamination process.

Distortion in windshields is measured in terms of refractive power. Refractive power is the change in the angular deviation along over distance. At a high enough level, it can result in noticable optical distortion. The refractive power is expressed in diopters.

$$D_\varepsilon = \frac{d\alpha_\varepsilon}{dx} \frac{1}{\cos\varepsilon} \quad (1)$$

Where:

$\varepsilon$: angle formed between the ray of light 42 and a line perpendicular to the surface of the glazing 50

$\alpha_\varepsilon$: angular deviation $D_\varepsilon$: refractive power

Most large windshield production lines utilize online automated inspection system which scan the glass and produce a contour map showing the optical distortion in diopters.

Laminates produced by this invention have significantly lower distortion in the areas near the obscurations as compared to the same and similar laminates produced with screen print black frit.

Figure 8A:
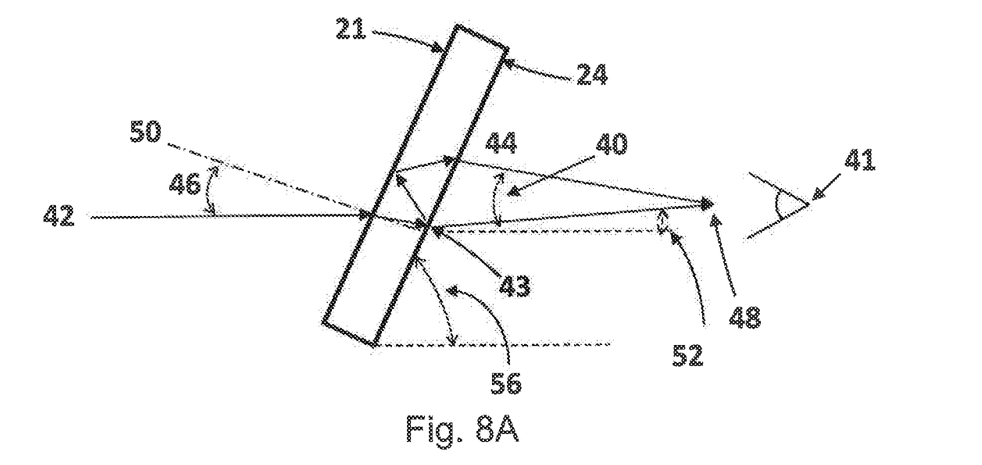
FIG. 8A shows the path of light through a laminate with interlayers of uniform thickness.
Figure 8B:
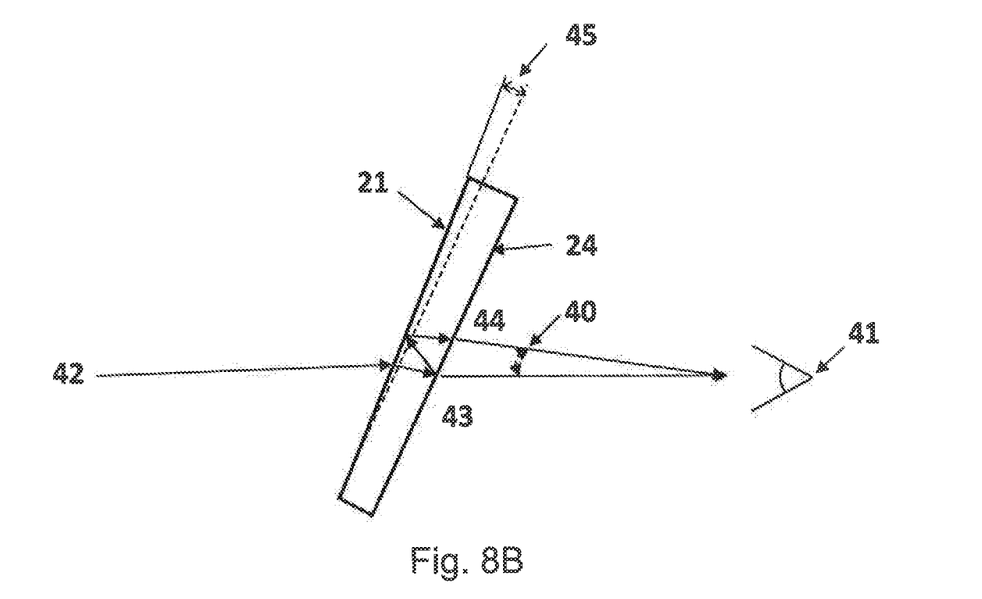
FIG. 8B shows the path of light through a laminate with interlayers having a wedge angle greater than zero.

Double image, another problem of the prior art, is illustrated in FIGS. 8A and 8B.

A ray of light 42 enters the surface of the glass at an incident angle 46 and passes through the glazing to the observer 41. The light bends (refracts) as it passes through the glazing. The angle by which the light bends is known as the angular deviation 52. This refraction of the light causes a shifting of the apparent position 43 of the object observed Some of the light from the ray 42 entering the glass is reflected back from the inside surface 24 and exits the glazing. A portion of the reflected light is again reflected back from outside surface 21 resulting in a double image. The separation angle 40 is the angle between the primary 43 and secondary image 44 and the observer 41. If the primary and secondary images are coincident, then the separation angle is zero. Regulatory requirements limit the separation angle to 15 minutes of arc for vision zone A (as defined by United Nations Regulation 42, revision 3) and 25 minutes of arc for vision zone B. However, it is well known that the maximum amount of double imaging imperceptible for the human eye is 7 minutes of arc.

The double image angle, $\eta$ 40, is calculated as shown in equation 2. It increases with decreasing angle of inclination 56, increasing curvature of the glass surface 24 and with increasing size of the glazing. The double image angle, $\eta$ 40, can be reduced by altering the angle between the plies of glass as shown in FIG. 8B. Normally, the glass surfaces are substantially parallel to each other. By creating an angle 45 between the surfaces, the primary and secondary images can be shifted towards convergence.

$$\eta = \frac{2t\sin(\varepsilon)}{R\sqrt{n^2 - \sin(\varepsilon)^2}} \quad (2)$$

where:

$\eta$: double image angle $t$: thickness of the glazing $n$: refractive index $R$: radius of curvature The angle between the plies of glass is adjusted through the use of an interlayer that has a non-uniform thickness, typically tapering from a thickness greater than the standard 0.76 mm at or near the top of the glazing a lesser thickness at the bottom. Such interlayers are produced through extrusion of the plastic. Such interlayers are known as "wedge" interlayers. They can also be formed, to a lesser extent by shaping (stretching) of the interlayer. Shaping is typically done to create a curved sunshade 6. Table 1 shows the wedge angle and reduction in thickness for a standard 0.76 mm thick interlayer over 1 meter as a function of sunshade radius.

Note that wedge interlayer can be shaped to increase the wedge angle. Any combination of wedge and shaped interlayer can be used to obtain the desired results.

Figure 7A:
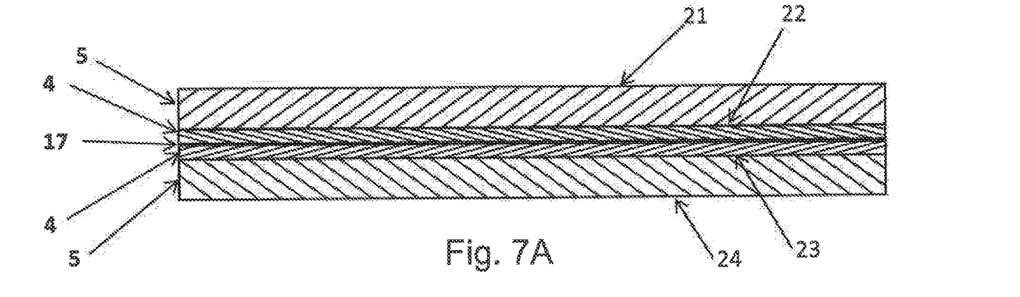
FIG. 7A shows a laminate with interlayers of uniform thickness
Figure 7B:
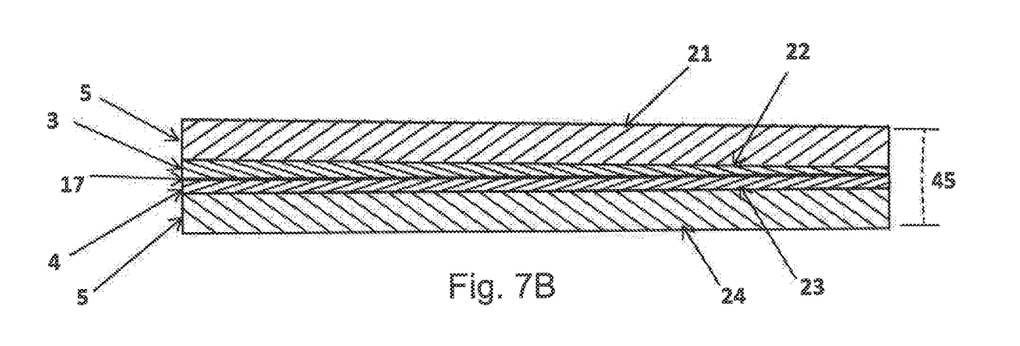
FIG. 7B shows a laminate with one interlayer sheet of uniform thickness and one with a wedge angle greater than zero.
Figure 7C:
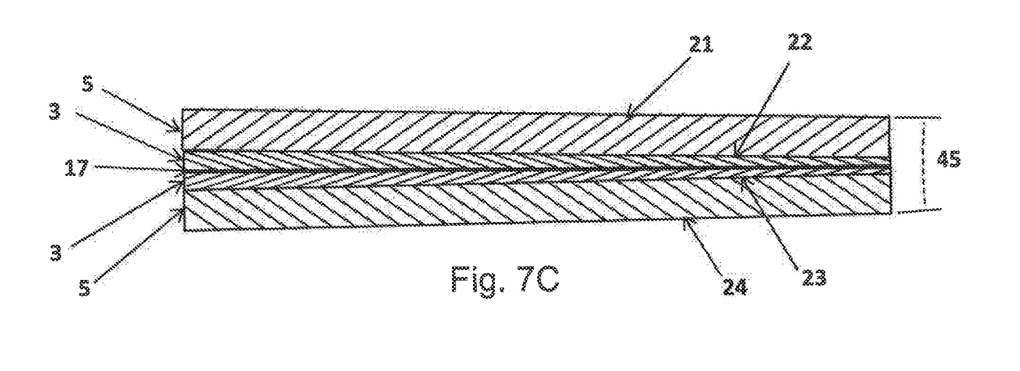
FIG. 7C shows a laminate with two interlayer sheets having a wedge angle greater than zero.

FIGS. 7A, 7B and 7C show: a laminate with two standard interlayers, a laminate with one wedge interlayer and a laminate with two wedge interlayers.

Wedge interlayer can be used with a printed obscuration to further reduce double vision.

TABLE 1

Sunshade Radius vs. Wedge Angle

| Sunshade Radius m | Interlayer Thickness mm | Wedge Angle mrad |
|---|---|---|
| 2.0000 | 0.5067 | 0.253 |
| 2.5000 | 0.5429 | 0.217 |
| 3.0000 | 0.5700 | 0.190 |
| 3.5000 | 0.5911 | 0.169 |
| 4.0000 | 0.6080 | 0.152 |
| 4.5000 | 0.6218 | 0.138 |
| 5.0000 | 0.6333 | 0.127 |
| 5.5000 | 0.6431 | 0.117 |
| 6.0000 | 0.6514 | 0.109 |
| 6.5000 | 0.6587 | 0.101 |
| 7.0000 | 0.6650 | 0.095 |
| 7.5000 | 0.6706 | 0.089 |
| 8.0000 | 0.6756 | 0.084 |
| 8.5000 | 0.6800 | 0.080 |
| 9.0000 | 0.6840 | 0.076 |
| 9.5000 | 0.6876 | 0.072 |
| 10.0000 | 0.6909 | 0.069 |

Enamel frit and printed ink can both be used on the same part and in any combination that is convenient. As an example, the obscurations could be printed on the sheet 17, while the other markings and images can be made with a conventional black screen print. The markings and images do not have the same detrimental effect as the obscuration prints, due to their small size and function.

Figure 10:
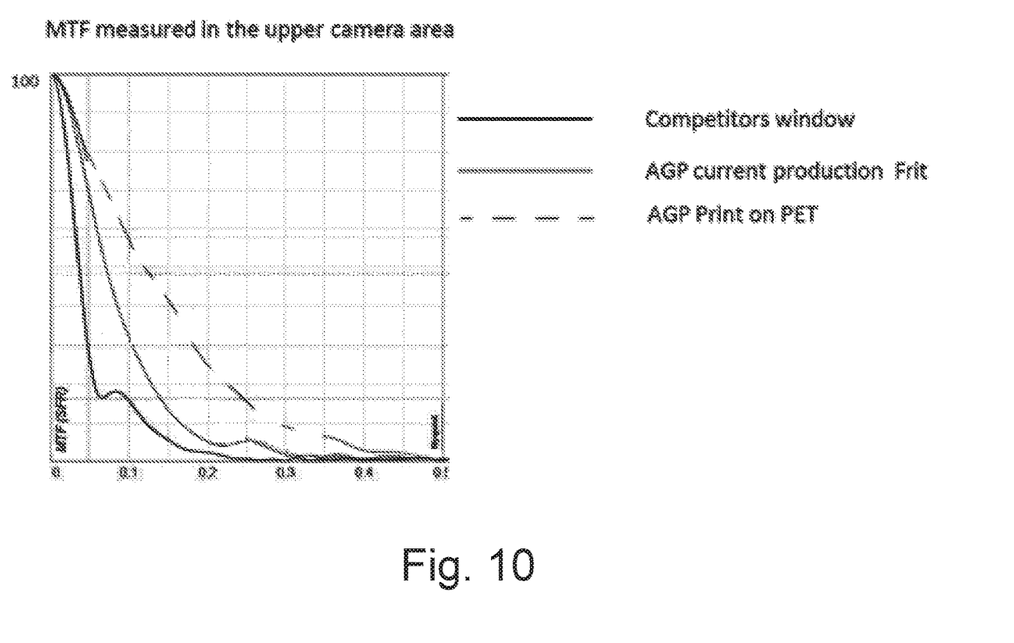
FIG. 10 shows a graph of the MTF measured in the upper camera area.

Experimental results have demonstrated the remarkable and unexpected magnitude of improvement of the invention and are shown in the following table (Table 2) and graphs. Fracture strength is more than doubled, MTF is drastically improved (see FIG. 10), distortion is reduced by a factor of six and double image if reduced from 15" to 3". One should also note that all four of these parameters are critical to the operation of a safety camera.

TABLE 2

|  | Laminate with Black Frit | Laminate with Obscuration Printed on Film |
|---|---|---|
| Fracture Strength (ring-on-ring) | 60 Mpa | 115 Mpa |
| Distortion (Camera window - 5 mm from the black edge) | 150 milli diopters | 25 milli diopters |
| Double image (Camera window - 5 mm from the black edge) | 15" (arc minute) | 3" (arc minute) |

As camera system for cars improve and cars now have advanced driving assisted systems the vehicles windshield becomes an important component of the complex lens system that makes up the vehicle vision system. For our interest here our windshield serves as a lens in front of the camera, comprising one component of a complex lens system. The best way to evaluate this system is by measuring the MTF, see FIG. 10.

Modulation Transfer Function or "MTF" is the most widely used scientific method of describing lens performance. The modulation transfer function is, a measure of the transfer of modulation (or contrast) from the subject to the image. In other words, it measures how faithfully a lens reproduces (or transfers) detail from the object to the image produced by a lens. When we graph MTF we chart against contrast dropping from 100 to 0 and Spatial frequency (Nyquist frequency). Spatial frequency is the ability to resolve over distance and as contrast drops this ability gets weaker. Plotting in this X&Y gives us the total systems contrast and its ability to faithfully reproduce into the distance. This is especially important in semi-autonomous or autonomous driving vehicles as the locus will be the horizon and all images in the focal plane will need to be detectable both in shape and in size.

Printing the obscuration has resulted in a remarkable improvement in system MTF as compared to the same production model with a normal frit obscuration.

ADVANTAGES

1. Best in class optics.
2. Frit induced surface defects are eliminated.
3. Residual stress caused by non-uniform heating of the frit is eliminated.
4. Residual stress caused surface mismatch due to the frit is eliminated.
5. Low distortion, comparable to ordinary clear glass.
6. LOW double image, comparable to ordinary clear glass.
7. Lower probability of breakage.
8. Higher yield during bending due to elimination of non-uniform heating.
9. Higher yields during lamination due to higher strength, lower residual stress and less surface mismatch.

Embodiment 1

Figure 5:
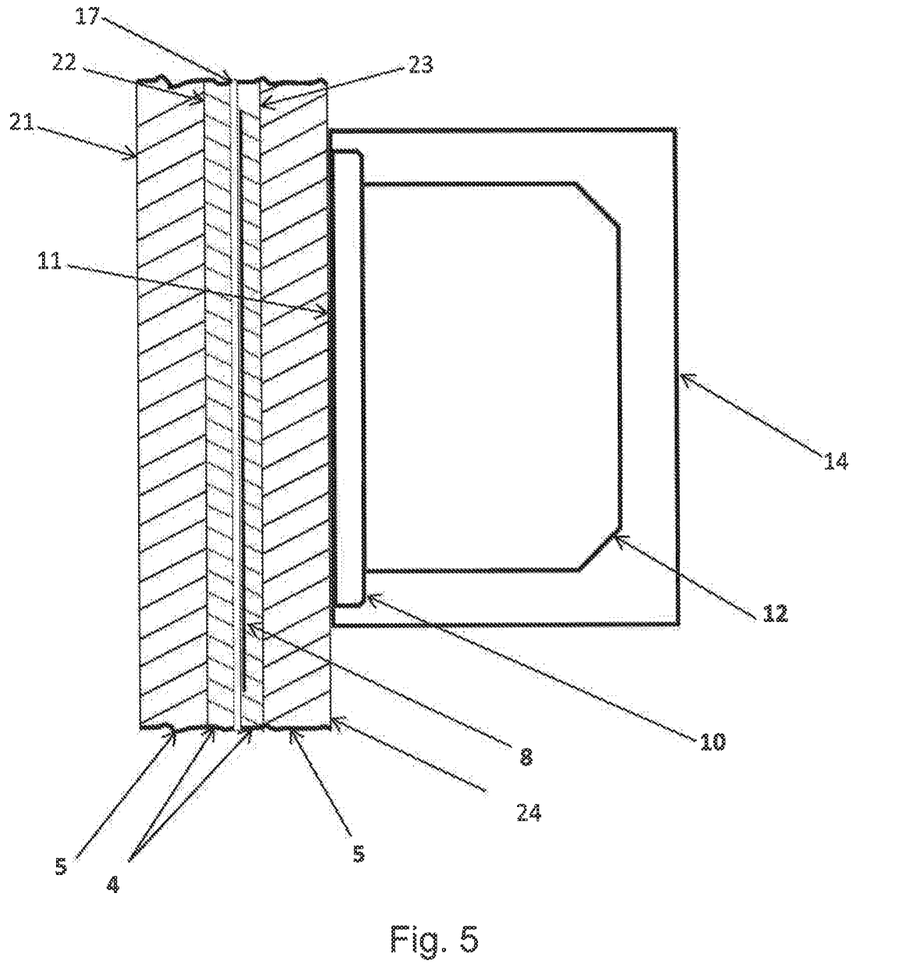
FIG. 5 shows the obscuration 8 printed on the film 17 facing the third surface 23.

The windshield of FIG. 1 comprising a black enamel frit band 32, a black enamel frit wiper rest area 31 one wedge interlayer, and an equipment obscuration 8, 34 printed on one surface of the plastic sheet 17 (FIG. 5).

Embodiment 2

Figure 6:
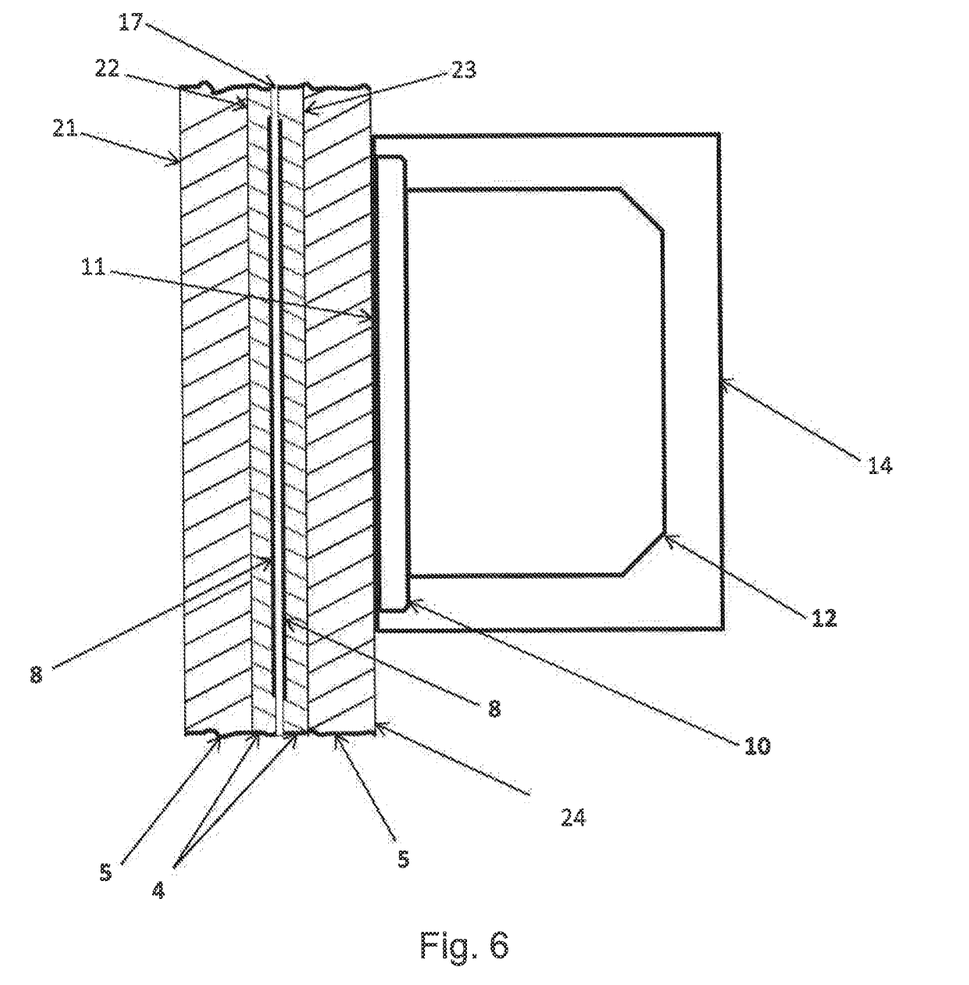
FIG. 6 shows the obscuration 8 printed on both side of the film 17.

The windshield of FIG. 1 comprising a black enamel frit band 32, a black enamel frit wiper rest area 31 and an equipment obscuration 8, 34 printed on both surfaces of the film 17 (FIG. 6).

Embodiment 3

The windshield of FIG. 1 comprising a wiper rest 31, black band 32 and an equipment obscuration 8, 34 printed on one surface of the film 17 (FIG. 5).

Embodiment 4

The windshield of FIG. 1 comprising a wiper rest 31, black band 32 and an equipment obscuration 8, 34 printed on both surfaces of the film 17 (FIG. 6).

Embodiment 5

The windshield of FIG. 1 comprising a film 17, a wiper rest 31, black band 32 and an equipment obscuration 8, 34 printed on one surface of the film (FIG. 5).

Embodiment 6

The obscuration combinations of the previous embodiments, 1-5, further comprising an equipment obscuration separate from the black band and spaced from said black band by at least 3 mm illustrated in FIG. 2.

Embodiment 7

A panoramic windshield (FIG. 3) with the equipment obscuration printing on one surface of the film 17 and an enamel frit wiper rest/black band.

Embodiment 8

A panoramic windshield (FIG. 3) comprising and equipment obscuration printed on both surfaces of the film 17 (FIG. 6).

The invention claimed is:

1. An automotive laminated windshield, wherein at least one portion of the windshield serves as a window for at least one camera, said windshield comprises:
    at least two glass layers;
    at least one film layer positioned between the glass layers;
    at least two plastic interlayers to attach the glass layers to said at least one film layer; and
    at least one equipment obscuration for said at least one camera window printed onto said at least one film layer, such that at least one machine vision parameter selected from the group consisting of fracture strength, distortion and Modulation Transfer Function is improved in said at least one portion of the windshield serving as a camera window in comparison with that of the corresponding portion with a black enamel frit obscuration.

2. The automotive laminated windshield of claim 1 wherein one film layer of said at least one film layer is a PET film layer.

3. The automotive laminated windshield of claim 1 wherein at least one plastic interlayer of said at least two plastic interlayers is a wedge interlayer.

4. The automotive laminated windshield of claim 1 further comprising a performance film plastic layer.

5. The automotive laminated windshield of claim 1 wherein said at least one obscuration for said at least one camera window is printed using a printing process selected from the group consisting of inkjet printing, screen printing and pad printing.

6. The automotive laminated windshield of claim 1 wherein said at least one obscuration for said one camera window is printed with an ink selected from the group consisting of solvent inks and UV inks.

7. The automotive laminated windshield of claim 1 further comprising an obscuration band printed as a black enamel frit obscuration.

8. The automotive laminated windshield of claim 7 wherein said at least one obscuration for said at least one camera window is separated from and spaced from the obscuration band.

9. The automotive laminated windshield of claim 1 wherein the film layer is comprised of at least one layer composition.

10. The automotive laminated windshield of claim 9 wherein said at least one layer composition is selected from the group consisting of metal based heat reflecting films, non-metal based heat reflecting films, tint films, heat absorbing films, Suspended Particle Device (SPD) films, Polymer Dispersed Liquid Chrystal (PDLC) films, conductive coated films, PET (polyethylene terephthalate) and combinations thereof.

11. The automotive laminate windshield of claim 1 wherein said at least one equipment obscuration comprises an opening to provide a forward field of view for each camera.

12. The automotive laminate windshield of claim 1 wherein the distortion parameter is improved between 1% and 83%, preferably between 1% and 50%.

13. A vehicle utilizing the laminate of claim 1.

* * * * *